United States Patent [19]
Schwartz

[11] 3,744,862
[45] July 10, 1973

[54] HIGH STRENGTH, HIGH TEMPERATURE SELF-LUBRICATING BEARING RETAINER

[76] Inventor: Kenneth P. Schwartz, 2604 Cross Country Road, Dayton, Ohio 45324

[22] Filed: Mar. 1, 1972
[21] Appl. No.: 230,694

[52] U.S. Cl. ............................................. 308/201
[51] Int. Cl. ............................................. F16c 19/20
[58] Field of Search.................. 308/201, 217, 188; 29/148.4 C

[56] References Cited
UNITED STATES PATENTS

| | | | |
|---|---|---|---|
| 2,875,005 | 2/1959 | Blazek et al. | 308/201 |
| 3,472,567 | 10/1969 | Johnson | 308/201 |
| 3,567,504 | 3/1971 | Hopkins et al. | 308/188 |

Primary Examiner—Charles J. Myhre
Assistant Examiner—Frank Susko
Attorney—Harry A. Herbert, Jr. et al.

[57] ABSTRACT

A filament-wound rolling bearing retainer member fabricated from a high strength, lightweight and high temperature-resistant, self-lubricating material continuously wrapped in fiber form, together with a bonding matrix, on a bias around a mandrel, coated with a release agent, to form a basic shell thereafter removable from the mandrel and machined into the desired retainer configuration.

1 Claim, 4 Drawing Figures

PRIOR ART

PATENTED JUL 10 1973 3,744,862

3,744,862

HIGH STRENGTH, HIGH TEMPERATURE SELF-LUBRICATING BEARING RETAINER

BACKGROUND OF THE INVENTION

This invention relates generally to the filament winding of rolling bearing retainers and, in particular, to a self-lubricating-type of filament-wound retainer.

In many aircraft and other aerospace applications, the loss of lubricants particularly in concealed and/or critical bearing areas and/or under field conditions has proven to be a considerable problem, even to the extent of having caused the loss of aircraft, especially in Southeast Asia. Accordingly, it became self-evident that a need existed for developing an improved rolling bearing assembly that would substantially eliminate the usual requirement for the periodic lubrication thereof and, at the same time, provide increased strength and resistance to operating temperatures while retaining a relatively light weight. In this regard, previously-designed bearing components have included the development of sintered and other relatively solid structures that have been coated with a lubricant material. An example of the sintered-type of bearing retainer is described in U.S. Pat. No. 3,027,626, issued on Apr. 3, 1962 to J. J. Murphy. In this patent, a sintered nylon is used that has been formed in accordance with the teaching in another patent namely, U.S. Pat. No. 2,695,425, issued on Nov. 30, 1954 to L. L. Stott. The Murphy device makes use of the porous nature of the sintered nylon of Stott and further machines it into the desired ball bearing reatiner configuration and thereafter impregnates the finished form with oil that provides the necessary bearing lubrication through a capillary action.

In another prior developed bearing, disclosed in U.S. Pat. No. 3,562,885 and issued on Feb. 16, 1971 to A. R. McCloskey, a solid Teflon liner is used in one form thereof, to provide a self-lubricating means between the outer member 1 and the inner member 2 (Note FIG. 2, for example) of a spherical bearing. This patent notes further that, in a second form thereof, the bearing liner could be fabricated from cloth woven of Teflon threads. Again, such a cloth constitutes a relatively solid structure that is obviously rather inflexible in form. In still another patent; namely, U.S. Pat. No. 2,100,159, issued to V. Curstadt on Nov. 23, 1937, a porous bushing consisting of a network of very fine crossed wires or metal filaments is disclosed. This crossed-wire configuration is specifically taught as being for the express purpose of providing openings or interstices for receiving a lubricant therebetween. In a further disclosure of a previously-designed bearing, described in U.S. Pat. No. 3,567,504, issued on Mar. 2, 1971 to V. Hopkins et al., an elongated, cloth-like element 36 (Note FIG. 4) of fiber glass is passed between a pair of rollers 38 and is coated with a liquified solid lubricant at the station 40, and thereafter is wrapped around a mandrel at 44. This patent further teaches the use of a single fiber or multifibrous stand of fiber glass that may be likewise sprayed with a lubricant and then coiled around the mandrel 44.

The novel and yet simplified method of fabrication and bearing retainer member formed therefrom of the present invention constitutes a further improvement over the above-summarized previous developments initially by uniquely combining the filament-winding technique with the use of self-lubricating fibers, for the purpose of forming a rolling bearing retainer that, unlike the sliding bearing member of the aforementioned McCloskey patent, for example, with its self-lubricating liner, provides a basic self-lubricating structure of fibers that collectively exhibit and inherently provide the strength, wearability and built-in lubrication required for extended bearing operations. Additionally, as will readily appear hereinafter in the following summary and detailed description thereof, the multiple fibers comprising the improved construction of the present bearing retainer may be specifically and further oriented in a manner to be compatible with, and thereby more effectively resist excessive wear resulting from the load developed in a specific bearing design between the rolling bearing element and the retainer.

SUMMARY OF THE INVENTION

The present invention briefly consists of an improved, filament-wound rolling bearing retainer member fabricated from a self-lubricating material wrapped, in a bias, in fiber form around a mandrel coated with a release agent. After being wrapped in successive layers to the desired thickness, a basic shell structure is formed, which, thereafter, may be easily released from the mandrel and machined or otherwise formed into the desired retainer configuration. The filament structure thus formed provides a retainer member having increased strength, wearability and resistance to normal deterioration under varying operating temperature conditions. In addition, the fibers comprising the filament-wound retainer structure may, in accordance with the further teaching of the present invention, be specifically oriented, by varying the angle of wrap around the mandrel, in accordance with the direction of application of the load applied between the rolling bearing member and the roller or ball pocket formed in the retainer to thereby form a retainer of increased strength and wearability, and, at the same time, forming a relatively light weight structure.

Other objects and advantages of the invention will become apparent hereinafter in specific connection with the following disclosure, taken in connection with the accompanying drawings, in which:

DESCRIPTION OF THE PREFERRED EMBODIMENT

Figure 1:
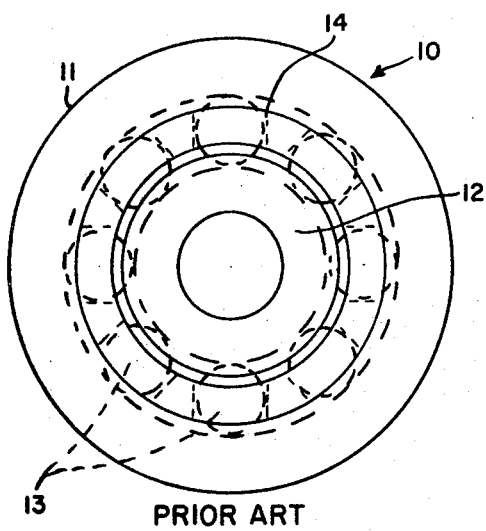
FIG. 1 is an overall assembly view of a standard-type of roller bearing to which the novel retainer element of the present invention may be applied.

Referring to the assembly view of FIG. 1, the new and improved retainer element of the present invention is shown generally at the reference numeral 14 as being installed in a standard-type of roller bearing assembly, indicated generally at 10 and comprising an outer race member 11, an inner race member 12 and a plurality of roller bearings 13. In this connection, it is noted that, although the following description is made with specific reference to a ball bearing assembly, the invention is just as easily applied to a roller bearing assembly. As is seen more particularly in FIG. 2, retainer member 14 incorporates a series of openings or ball pockets, as indicated at 15, for example, that are disposed in evenly-spaced relation around the circumference thereof and within which the plurality of ball bearings 13 may be naturally positioned when the present retainer element 14 is assembled between the outer and inner race members 11 and 12 as is illustrated in the aforementioned FIG. 1.

The foregoing roller bearing retainer element 14 is, in accordance with the novel teachings of the present invention, made more effectively and inherently self-lubricating and therefore substantially frictionless, and, moreover, of vastly increased strength for a given weight, over other previously-developed lubricating methods, by being uniquely fabricated from a self-lubricating material in filament form, in which the fibers thereof may be selected from either a relatively high temperature-resistant material comprised, for example, of either carbon, graphite or boron, or from a relatively low temperature-resistant material, such as Teflon, depending on the particular application. In either form of the invention, the aforementioned material may be fabricated through the use of conventional filament winding equipment, which is not herein disclosed since the specific nature thereof forms no part of the present invention. With such equipment, the selected material may be wound or wrapped in the aforementioned novel self-lubricating filament/fiber form, together with a suitable binder, such as an epoxy resin, for the relatively low temperature application of the inventive bearing retainer, or Sodium Silicate or Aluminum Phosphate for the relatively high temperature form thereof, on a mandrel of the size required for a selected bearing application. In the case of a tapered roller retainer, a tapered roller retainer-mandrel could be utilized. Said mandrel would have been previously coated with a suitable release agent such as a Teflon spray, for example, to thereby facilitate the separation therefrom of the filament wound structure being formed therearound.

Figure 2:
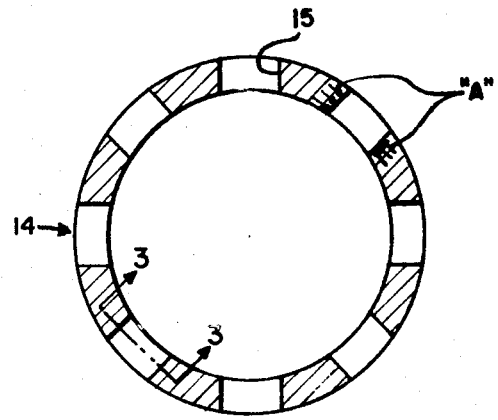
FIG. 2 is a cross-sectional view, generally illustrating further details of the improved retainer member of the overall assembly of FIG. 1, and, in particular, generally showing the filament/fiber orientation relative to the axis of the rolling bearing pocket.

The aforementioned filament/fiber winding or wrapping operation would continue, with the indvidual fibers being oriented in a generally circumferential relation to the axis of the mandrel or, in other words, to the axis of the retainer element 14, as is schemtaically depicted by the arrows at "A" in FIG. 2. This winding would proceed until a sufficient number of fiber layers have been formed to provide a basic retainer shell-structure having a predetermined thickness desired for a particular bearing retainer design, such as that indicated for the previously-referred to retainer element 14 of FIG. 1, for example. With the use of the technique of fabricating a retainer element, as at 14, by its filament winding on a mandrel, as outlined hereinabove, a new and improved self-lubricating retainer has been formed having greatly increased strength and more efficient resistance to wear under varying operating temperature conditions and yet performs its function with a relatively lightweight structure.

Figures 3A, 3B:
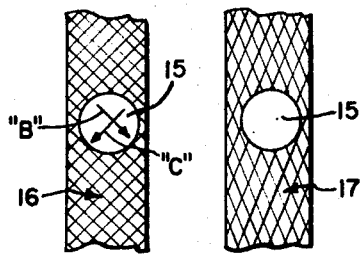
FIGS. 3, A and B, represent additional cross-sectional views, in partly schematic and broken-away form and taken about on line 3—3 of FIG. 2, illustrating the condition of the filament/fiber orientation both for relatively high and low angles of wrap, respectively.

Although the use of self-lubricating material in filament/fiber form and wound into the basic shell structure, as described hereinbefore, constitutes in itself a significant improvement over other forms of bearing retainers, the structure of the latter may, in accordance with an additional and novel teaching of the present invention, be still further improved by uniquely varying the filament layer angle between relatively high and relatively low angles of wrap, as is respectively depicted in FIGS. 3, A and B, to thereby achieve a substantial fiber orientation that is perpendicular or nearly perpendicular to the direction of application of the principle ball load, relative to the wall surface of the ball pocket 15, and which is further related to the rotational speed of the retainer element 14 for a particular bearing application. In other words, the key and significant feature of this aspect of the present invention resides in the novel teaching of the varying of the fiber orientation, by modifying the angle of wrap during its fabrication on the selected mandrel, to the degree necessary to make it compatible with the direction of the operating load, as applied by the ball, as at 13, to the wall surface of the ball pocket, as at 15 (FIG. 2). Thus, as is illustrated schematically in FIG. 3A, for example, if the principal load between the ball bearing 13 (FIG. 1) and the ball pocket 15 is in the direction generally indicated either by the arrow "B" or the arrow "C," one-half of the total filament/fiber wrap, the orientation thereof being generally denoted at 16 in the aforementioned FIG. 3A, would be oriented in direct, axial alignment with the direction of the ball bearing-retainer pocket-load application, as at "C," while the remaining half of the filament wrap would be aligned in perpendicular relation thereto, as at "B." A similar situation would exist for the relatively low angle-fiber orientation 17 of FIG. 3B. The actual principal or primary load application could, of course, be easily determined after operating a particular bearing assembly for a time sufficient to show the specific area or wall surface portion of the ball pocket, as at 15, that has undergone the most wear. Of course, a plurality of retainer elements, as at 14, could have been previously wound with a variety of angles of wrap giving several built-in variations in the orientation of the fibers thereof and the most nearly compatible one of the several previously formed retainers could then be quickly substituted in the particular bearing assembly under investigation. Alternatively, if the number of bearing applications for a particular program was not large enough to warrant the expense of having a plurality of bearing retainers of varying fiber orientations previously fabricated and placed on the shelf, then, again after determining the ball pocket area of most wear, a single retainer could then be fabricated by the self-lubricating filament winding technique of the present invention with its multiplicity of fibers oriented at the desired angle of warp to be compatible with the direction of the particular load application between the ball bearings 13 and the walls of the ball pockets 15.

Of course, to complete the formation of the retainer element 14, after its initial filament winding on a pre-sized mandrel by known filament winding equipment, the basic retainer shell formed thereby would thereafter be separated from the mandrel and then cut, machined or stamped, as desired, to the desired retainer dimensions, with the appropriate number and size of ball pockets, as at 15 (FIG. 1, for example), or roller slots formed therein. This results in a uniquely formed retainer of improved strength and wearability, as will as being self-lubricating, by the fact that the direction of the ball or roller load into the pocket or slot is oriented toward the filament/fiber ends.

Thus, the present invention constitutes a substantially improved rolling bearing retainer element that, because of its self-lubricating filament wound structure, is made considerably stronger and yet relatively light weight, and more wear-resistant to operating loads and temperatures, whether the relatively low or high temperature-resistant material is used for the filament. Also, the need for outside lubrication is all but eliminated. Moreover, an even stronger and more efficient filament wound retainer, as at 14, results from the unique and yet simplified additional teaching of this invention of specifically orienting the filament/fiber, by varying the angle of warp during its fabrication to thereby achieve compatibility with the principal rolling bearing load application to the ball bearing pockets or roller slots for a particular bearing operation.

I claim:

1. In a rolling bearing assembly having an inner race member, an outer race member spaced from said inner race member and a plurality of rolling bearing elements disposed in bearing contacting relation relative to, and in the space between said inner and outer race members; retainer element means intermediately positioned between said inner and outer race members and incorporating a series of evenly-spaced, rolling bearing element-receiving openings along, and extending through the circumference thereof for relatively loosely supporting in overlapping relation therein said plurality of rolling bearing elements; said retainer element means being comprised of bonding matrix and a self-lubricating material composed of at least one fiber continuously and filament wound into a plurality of individual fiber sections forming overlapping layers of the desired retainer structure configuration, and crossing at respective angles of warp predetermined for positively ensuring an overall fiber orientation having approximately one-half of the fiber section ends thereof in direct alignment with, and thereby substantially improving inherent retainer-strength and wear-life by directly resisting at least one principal rolling bearing-operational load acting into, and directly against the rolling bearing element-receiving openings.

* * * * *